United States Patent [19]
Roper et al.

[11] Patent Number: 5,870,563
[45] Date of Patent: Feb. 9, 1999

[54] METHOD AND APPARATUS FOR OPTIMIZING MESSAGE TRANSMISSION

[75] Inventors: Michael Ian Roper, Valley Park; Lawrence Steven Evans, Basingstoke; Graham Derek Wallis, Locks Heath, all of England

[73] Assignee: International Business Machines Corporation, Armonk, N.Y.

[21] Appl. No.: 540,506

[22] Filed: Oct. 11, 1995

Related U.S. Application Data

[63] Continuation of Ser. No. 80,154, Jun. 23, 1993, abandoned.

[30] Foreign Application Priority Data

Sep. 19, 1992 [GB] United Kingdom .................. 9219862

[51] Int. Cl.$^6$ ........................................... G06F 13/00
[52] U.S. Cl. ..................... 395/200.69; 395/885; 370/351
[58] Field of Search .............................. 395/800, 200.02, 395/200.1, 200.11, 200.13, 200.2, 831, 834, 838, 850, 500, 650, 885, 800.01, 200.31, 200.6, 200.68, 200.76, 200.79, 670; 370/17, 82, 83, 84, 99, 105.1, 351, 389, 396, 464, 465, 469, 476

[56] References Cited

U.S. PATENT DOCUMENTS

| | | | |
|---|---|---|---|
| 4,941,144 | 7/1990 | Mizukami | 371/5.5 |
| 5,150,464 | 9/1992 | Sidhu et al. | 395/200 |
| 5,191,583 | 3/1993 | Pearson et al. | 370/94.1 |
| 5,200,952 | 4/1993 | Bernstein et al. | 370/79 |
| 5,243,596 | 9/1993 | Port et al. | 370/94.1 |
| 5,258,983 | 11/1993 | Lane et al. | 370/118 |
| 5,317,568 | 5/1994 | Bixby et al. | 370/85.6 |
| 5,317,692 | 5/1994 | Ashton et al. | 395/200 |

OTHER PUBLICATIONS

European Search Report.

UK Search Report.

*Primary Examiner*—Alpesh M. Shah
*Attorney, Agent, or Firm*—Joscelyn G. Cockburn

[57] ABSTRACT

Computers are linked together to form a network. Messages are sent over the links between the computers in compressed, segmented form, the size of the segments being appropriate to the transmission characteristics of the link. A message previously received or transmitted by a computer is stored in compressed and segmented form. If it is desired to forward or re-transmit this message, the segment size of the stored form is compared against the optimum segment size for the link over which the message is to be sent. If there is a close match, then the stored segmented, compressed message is retrieved for direct transmittal, without having to resegment or recompress the message.

31 Claims, 4 Drawing Sheets

METHOD AND APPARATUS FOR OPTIMIZING MESSAGE TRANSMISSION

This is a continuation of application Ser. No. 08/080,154, filed Jun. 23, 1993, now abandoned.

FIELD OF THE INVENTION

The present invention relates to operating a computer in a network, in which messages are transmitted to and from the computer over links with other computers in the network.

BACKGROUND OF THE INVENTION

It is becoming increasingly common for individual computer systems to be linked together into networks to allow information to be communicated between them. There are several main types of network including an Integrated Services Digital Network (ISDN), which is based on telephone lines, and local area networks (LANs). Before data is transmitted over the network from one computer to another, the data ususally first undergoes some form of compression to reduce the volume to be sent, and is then formatted into one or more segments (often known as packets). Each segment typically contains, in addition to the basic data to be transmitted, address information, error checking (eg parity or CRC checks), flag fields identifying the start and end of the message, and so on. When a segment is received by a computer, the flag fields, check bytes, and so on are stripped out. The segments are then re-assembled and decompressed in order to recover the original data.

The extra information and processing associated with a segment means that there is a certain fixed overhead per segment, independent of segment size, so that it is most efficient to use as large a segment size as possible to transmit a given message. However, each segment is downloaded whole onto the network and during this time, known as latency, no other messages can be inserted onto the link, even if they have a higher priority than the message being downloaded. Thus latency effectively represents the period when the terminal is unavailable to send other messages, and so it is desirable to restrict segment size to prevent too long a latency. Since for a link of a given bandwidth the latency increases with segment size in line with the time taken to download the message, the optimum segment size is a compromise between avoiding the overheads associated with many small segments whilst minimising latency. As a result, higher bandwidth networks have larger optimum segment sizes.

If a computer decides to forward the data in a message to another computer in the network, all the compression, segmentation, addressing and so on must be repeated before the data can be re-transmitted over the network. In the past, such repetition of the compression and segmentation has not been a noticeable problem, primarily because most communications have been point-to-point (ie between two directly connected nodes) with no need to forward messages, or else the amount of forwarding has been relatively small (eg hub-satellite type networks have been used).

However, multimedia applications using modern networks, for example, collaborative processing or video conferencing, require many workstations to be connected together in a peer-to-peer arrangement. These involve the large-scale forwarding of messages between network nodes across high-bandwidth links. Two-way (or multi-way) real-time exchanges are common in such applications and it is essential to minimise transmission delay between the nodes in order to permit a natural and spontaneous interaction between the participants.

SUMMARY OF THE INVENTION

Accordingly, the invention provides a method of operating a computer in a network, including the steps of:

transmitting messages to and from the computer over links with other computers in the network;

processing messages before sending from an original form into a form suitable for transmission; and processing messages on receipt back into the original form;

said method being characterised by the steps of:

storing a message transmitted to or from the computer in either the transmitted form, or a form intermediate the original form and the transmitted form;

retrieving the stored message and processing it if necessary into a form suitable for transmission;

and sending the retrieved message to another computer.

The invention is based on the recognition that by storing messages in processed form, the need to repeat time-consuming processing can be avoided. A message for storage can either be generated at that particular node, or received from another node over the network. The former example arises in a multicast situation, where the node sends the same message to more than one other computer in the network, the latter where the node is responsible for forwarding an incoming message to another node in the network. In order to minimise the time spent processing the messages to prepare them for transmission, each message as it is received or created is stored in a processed form—either the transmitted form, or one intermediate the original form and the transmitted form. The next time that the message is to be sent over a link therefore, the stored message can be retrieved, and if in transmitted form, sent directly, or else processed into a form for transmission. In the latter case, the amount of processing required is still less than that needed to convert the message from its original form into the form for transmission.

Preferably the step of processing the message from the original form into a form suitable for transmission includes compressing the message, and said step of storing comprises storing the message in compressed form. Where the step of processing the message from an original form into a form suitable for transmission includes segmenting the message, it is also preferred that said step of storing comprises storing the message in segmented form. In general it is particularly advantageous to store a compressed version of the message, firstly because compression is more time-consuming than segmentation, and secondly because the same compression is valid for all links (unlike segmentation, where segment size must be taken into consideration as described below). Thus one possible strategy would be to assemble all incoming messages, and store only the compressed form. This could then be resegmented as required for subsequent transmission. However, in a preferred embodiment messages are stored in both compressed and segmented versions.

If segmented versions of the message are stored, then it can be determined whether one of the stored versions has a segment size appropriate for the link over which the message is to be transmitted. This could be based for example on the time required to re-segment the message relative to the delay that would be incurred by using a non-optimum segment size. The segment size of the stored form is compared with the optimum segment size for the link, and if a reasonable match is found, the stored version can be sent, rather than having to repeat the segmentation process. On the other hand, if no match is found, then overall it will be quicker to resegment rather than to send the message with the wrong size segments. Thus effectively an intelligent approach can be adopted to minimise the time required to transmit a message, balancing the extra overheads in using a non-optimum segment size against the processing required to re-segment the message.

In general each node already knows the physical characteristics of the links to adjacent nodes (eg LAN, bandwidth, etc). It is also beneficial to monitor the current performance of the network in order to determine the optimum segment size for each link, since the performance of any given link can be seriously affected by the volume of traffic on the link. Actively monitoring performance can therefore give a much more accurate picture of the current network characteristics.

If a message must be resegmented for transmission, the new segmented version can be stored. It is therefore possible to generate multiple stored versions of the same message, each having a different segment size. In order to prevent the volume of stored messages from becoming too large, it is desirable to delete a stored message if it is decided not to forward the message to another computer. Other approaches are also possible, for example deleting messages that have not been used within a specified time interval. It should be appreciated that even if the stored processed version of a message is deleted, it can still be forwarded by re-using the message in its original form, but in this case the segmenting, compressing, and so on must be re-performed.

In a preferred embodiment, the message is also stored in original form, and each processed form of the message is stored in a linked chain appended to the stored original form of the message, together with some form of reference to identify the processed forms. Thus a first layer or subsystem that is responsible for compressing, segmenting and storing a message, passes the reference to the application to decide what action to take in response to the message. The application then returns its decision to the first subsystem, using the reference again to identify the message. One possibility for the reference is to use a pointer to the original version of the message, but many other implementations are also suitable: for example, the first subsystem could maintain a table listing the identity, available segment sizes and storage location of each stored message. An index to the entry for each message could then be passed to the application as a reference with which to subsequently identify that particular message. The actual implementation adopted will depend on factors such as the operating system environment and so on.

The invention also provides a computer adapted for inclusion in a network, wherein messages are transmitted to and from the computer over links with other computers in the network, messages being processed before sending from an original form into a form suitable for transmission, and being processed on receipt back into the original form; and characterised by:

means for storing a message transmitted to or from the computer in either the transmitted form, or a form intermediate the original form and the transmitted form;

means for retrieving the stored message and processing it if necessary into a form suitable for transmission;

and means for sending the retrieved message to another computer.

In a preferred embodiment, the computer includes both means for compressing the message and means for segmenting the message in order to process the message from the original form into a form suitable for transmission, the message being stored in compressed and segmented form. It is further preferred that the computer includes means for determining whether a stored message has a segment size appropriate for the link over which the message is to be transmitted.

Other features in the preferred embodiment are means for monitoring the current performance of the network in order to determine the optimum segment size for each link and means for deleting a stored message if it is decided not to forward the message to another computer.

The invention further provides a method of transmitting data to a subset of a network of such computers, the method comprising the steps of:

transmitting a first message specifying the subset of the network to which the data is to be transmitted; and transmitting a second message containing the data, whereby receiving workstations can use the information in the first message to forward the second message to another computer in the network without having to first process the second message back into its original form.

This method is required in view of the fact that if messages are being stored in a segmented or compressed form for example, there is a premium on being able to forward them unaltered, so that the already available processed form can be used. This can lead to a difficulty when data is only being sent to a subset of the network, in which case the addressing information changes en route around the network. This problem can be alleviated by sending the addressing information ahead in a first message, with the data following in a second message. Each node can then use the information in the first message to forward the second message unaltered as appropriate. Although the first message does need updating as it progresses through the network, and so will need to be re-processed, it is generally much smaller than the second (data) message, and so this can be done comparatively quickly.

BRIEF DESCRIPTION OF THE DRAWINGS

An embodiment of the invention will now be described by way of example with reference to the following drawings.

DESCRIPTION OF THE PREFERRED EMBODIMENT(S)

Figure 1:
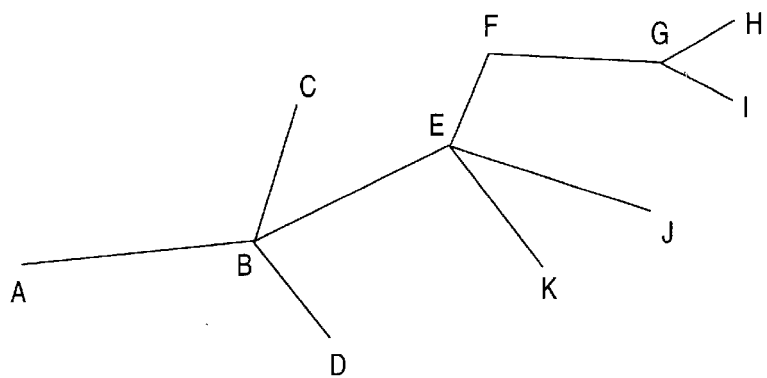
FIG. 1 is a schematic drawing of a computer network.

FIG. 1 shows a set of workstations (A, B, C . . . K) joined together into a computer network. The pattern of links shown is known as a "minimum spanning tree". Such a network is characterised by the absence of any closed loops, so that there is one and only one route between any two nodes. This has advantages as regards the simplification of addresses (note that the pattern of links shown in FIG. 1 is not unique in this respect). The present invention is particularly beneficial for this type of network since the degree of message forwarding is relatively high, but is equally applicable to other network topologies. For example, the invention will also be of benefit in all-to-all networks, in which every node is connected to every other node, since whilst this topology does not require message forwarding, it does demand a high degree of multi-casting—ie one node sending the same message to many other nodes (see Computer Networks by AS Tanenbaum, 1988, Prentice-Hall, for a further discussion of network configurations and properties).

Typically the links in the network of FIG. 1 will not be all of the same type. For example, links B-E, E-F and F-G might be over ISDN transmission lines, whilst A-B, B-C and B-D might be part of one LAN, E-J and E-K part of another LAN, and G-H and G-I part of a third LAN. These links, even if nominally of the same type or members of the same LAN, may have different bandwidths and different volumes of traffic on them, resulting in differences in transmission performance. Many other types of link, such as X. 25, may also be connected into the network.

Figure 2:
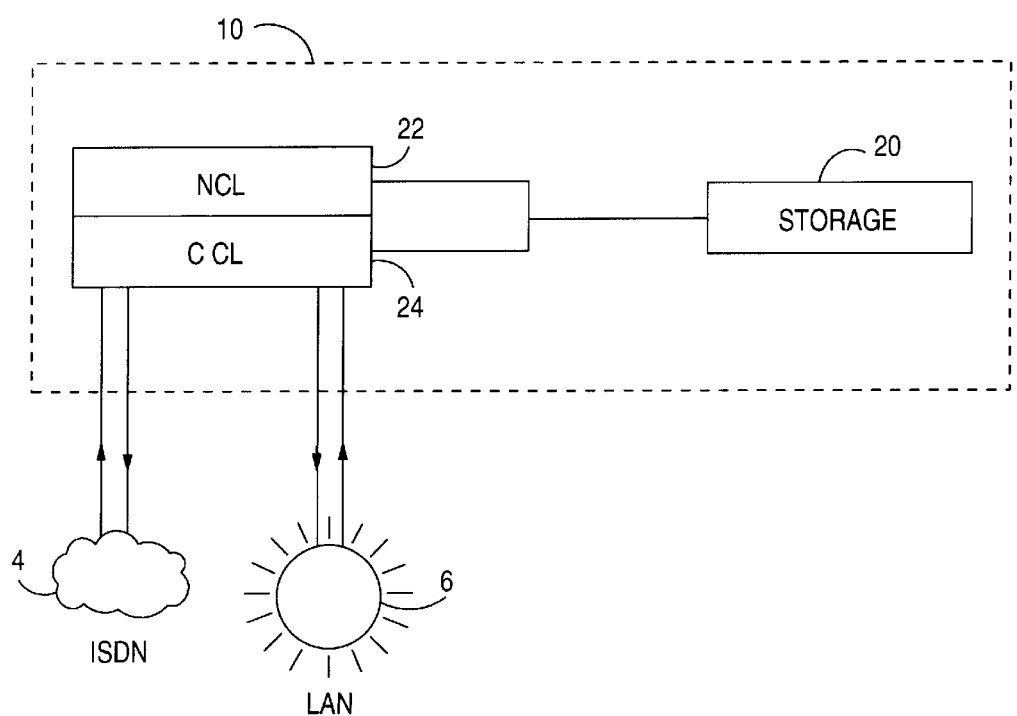
FIG. 2 is a simplified diagram of a workstation forming part of the network of FIG. 1.

FIG. 2 illustrates a workstation forming a node in the network of FIG. 1. This will typically be a conventional computer 10, having memory 20, processor etc. The workstation has connections to a LAN 6 and ISDN 4. The workstation is under the control of an application program (not shown), which generates messages for transmission to other nodes, and which interprets incoming messages. As is well-known in the art, several layers of processing are provided to translate messages between a form suitable for transmission over a network, and the form in which they are processed by the application program. Only the two layers pertinent to the present invention, known as the Common Communications Layer (CCL) 24 and the Network Control Layer (NCL) 22, are depicted in FIG. 2. The CCL maintains details of the transmission link over which a message is to be sent (eg whether it is ISDN, LAN or whatever), and is also responsible for compression and segmentation (based on the information about the link being used). The processing layers below the CCL, which are typically responsible for error correction etc, handle only segments. By contrast, the processing layers from the NCL upwards are only concerned with whole messages: the type of link over which a message is received or transmitted is transparent to them. Note that ideally the application program is best suited to do the compression, since it knows about the data and therefore which compression algorithms are appropriate. However, the application program is ignorant about the type of link over which the data is to be transmitted, and whereas compression may be very desirable for a low bandwidth link, it may be unnecessary and a waste of time for a high bandwidth link. Thus the application program may just perform preliminary compression, or no compression at all, leaving this responsibility primarily to the CCL. It should be appreciated that this split of function between the NCL and CCL is not an essential feature of the invention, but rather a facet of this particular implementation. Other network communication systems may have different arrangements.

Figure 3:
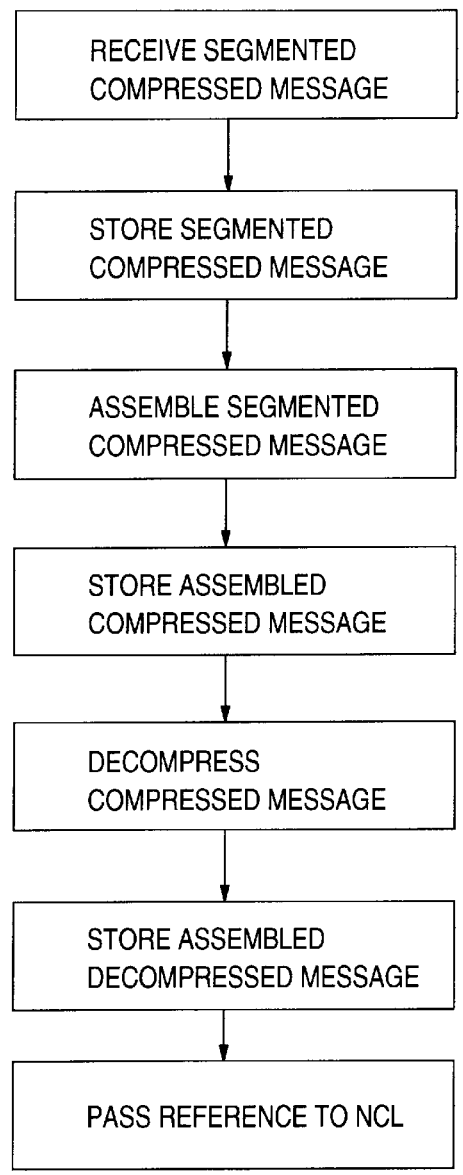
FIG. 3 is a flow-chart showing the processing performed on an incoming message.

The processing of an incoming message is depicted in the flow chart of FIG. 3. An incoming message in segmented, compressed form is received from the network by the CCL, having been duly processed by lower layers. The CCL stores the message in segmented, compressed form and then combines the segments to re-assemble the message (in fact in practice the segments are stored and combined as they are received one at a time). The compressed, assembled message is also stored. Finally, the message is decompressed into its final (original) form, which is again stored with a unique identifier, before being passed with the identifier up to the NCL layer.

Figure 4:
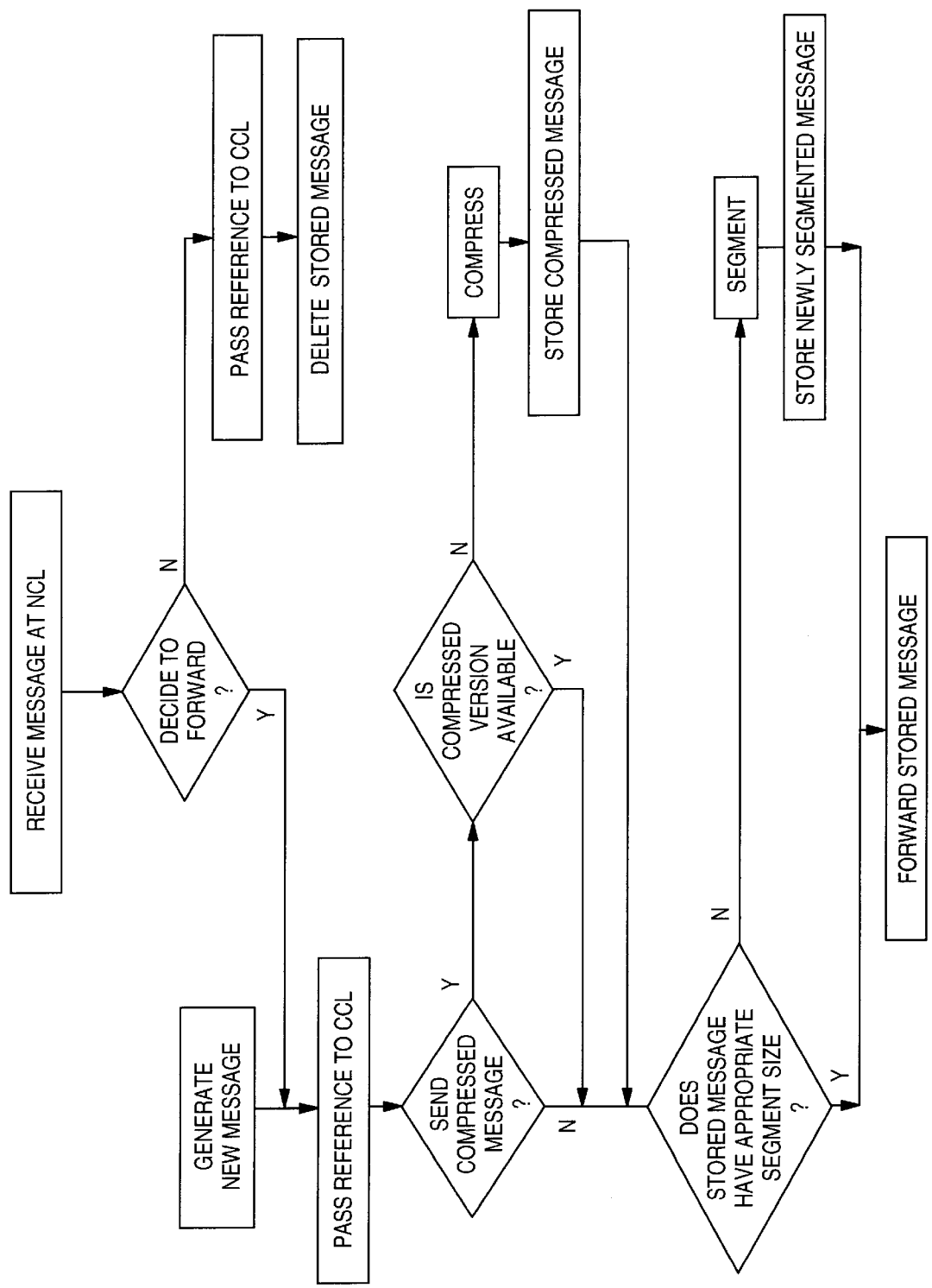
FIG. 4 is a flow chart showing the processing performed on an outgoing message (the top of FIG. 4 can be regarded as contiguous with the bottom of FIG. 3)

Subsequent processing of the incoming message is shown in FIG. 4. The NCL decides whether or not to forward the message, based if desired on the information contained within the message itself. If the NCL decides to forward the message to another node in the network, it passes the destination address and unique identifier back to the CCL. Alternatively, if the NCL makes a definite decision that the message is not to be forwarded, this information together with the identifier is passed back to the CCL. The CCL can then delete the message from storage.

FIG. 4 also illustrates the processing of an outgoing message, whether it is a received message that is now being forwarded to another node or a message that has been generated by that particular node. In both cases the message is received by the CCL from the NCL in the form of an identifier and a destination address. The CCL firstly determines whether to compress the message based on the characteristics of the link. In some cases compression may not be desirable (for example, because the message originates from a video adapter card, which has already performed its own hardware compression), but in general compression will be required. In this case the CCL determines whether a compressed version already exists: if not, the message must be processed to produce a compressed version, which is stored. The CCL then determines whether there are any stored versions of the segmented message (compressed or uncompressed, according to the desired form) which have a segment size appropriate for the link over which the message is to be transmitted, and if so, uses that stored version of the message to avoid having to resegment. If no appropriate stored segment size is located, then the CCL segments the message to a suitable size for the link. This (re) segmented message is then transmitted over the link, as well as being stored. Note that since a message may have to be sent to several nodes over a variety of links it quite possible for a message to be stored in more than one segment size, both in compressed and uncompressed form. It is also possible for the NCL to indicate in its transmission request to the CCL that a message is to be deleted after sending, if it is not desired to forward the message to any other computers.

As presently implemented, the selection procedure for determining which form of message to send is relatively uncomplicated. As a first step it is decided whether to compress the message, based on the specified link characteristics, and then secondly the stored segmented versions are examined to try to find an appropriate segment size. The algorithm used for this second step is simply to look for any stored version of the message which has a segment size in the range 0.5–1 times the optimum segment size, as specified in the link characteristics (in general it is not a good idea to go over the optimum segment size, in case this has been set to the maximum segment size that the transmitting software can handle). However, it would be possible to use much more complicated criteria to determine whether to process a message or whether to use a stored version. For example, the algorithm can combine the compression/ segmentation steps, using perhaps an uncompressed version instead of a compressed version if the former was already available in the correct segment size. Other factors to take into consideration might be the compression/decompression times at the transmitting and receiving nodes, the link bandwidth, the trade-off between using a non-optimum segment size and having to re-segment, and so on. It is also possible for the CCL not only to use stored information about network conditions (optimum segment sizes etc), but also to actively monitor current traffic (eg by echoing—sending out messages and waiting for them to be returned). This knowledge can all be put together in order to decide whether an available segment size is currently suitable for a particular link, or whether a message should be transmitted at a slightly non-optimum segment size or in a compressed/uncompressed form if this would lead to an overall reduction in transmission time.

It is therefore possible to adopt a very sophisticated approach in determining how much re-processing to do. The only restriction is that there is no point in using such complex methods if the extra time required to make a decision results in an overall decrease in efficiency.

As an indication of the timings involved, consider the transmission firstly of a 1 MByte bit map (eg from a graph on screen), and secondly of a 10 kByte video frame (these might typically be produced at 10 frames per second). Compression of the bit map (hopefully down to say 100 kBytes) might typically take 2–3 seconds, with a roughly equivalent time for decompression. The video frame is likely to have already been hardware compressed. Over a 250 kByte per second LAN connection, the bit map can be transmitted in 4 seconds, rendering compression unattractive, but over a 8 kByte per second ISDN line, compression will produce a substantial saving in net transmission time. In general, the segmentation time is perhaps only 10% of the compression time, and so a less significant factor for the bit map. However, for the video frames it can be essential to minimise transmission delay in order to allow natural interaction between participants in a video conference. Therefore a saving of as little as 0.01–0.05 seconds in not having to re-segment at each terminal is valuable, especially considering the cumulative effect if a signal is transmitted via several terminals.

Figure 5:
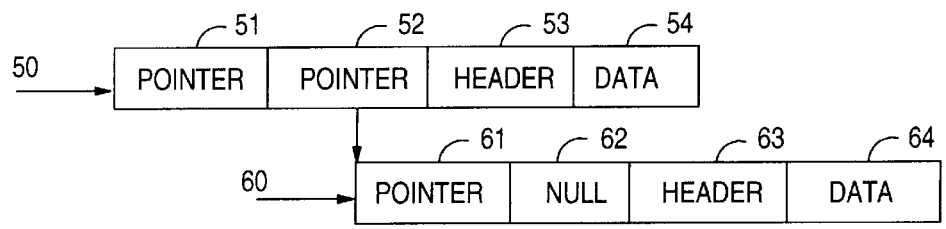
FIG. 5 illustrates how a message is stored in segmented form.

FIG. 5 shows the form in which the CCL stores a segmented message. The message consists of a sequence of packets or segments (two in this case), each packet 50, 60 comprising data 54, 64 and a header 53, 63 containing address information and so on. The CCL inserts two fields (51, 52 and 61 62 respectively) at the front of each packet. These two fields are not part of the message as such, and are not transmitted over the link, but rather act as control devices for the CCL. The second of the two pointers 52 is used to chain the sequence of packets in the message together, the end of the sequence being indicated by a null value 62.

Figure 6:
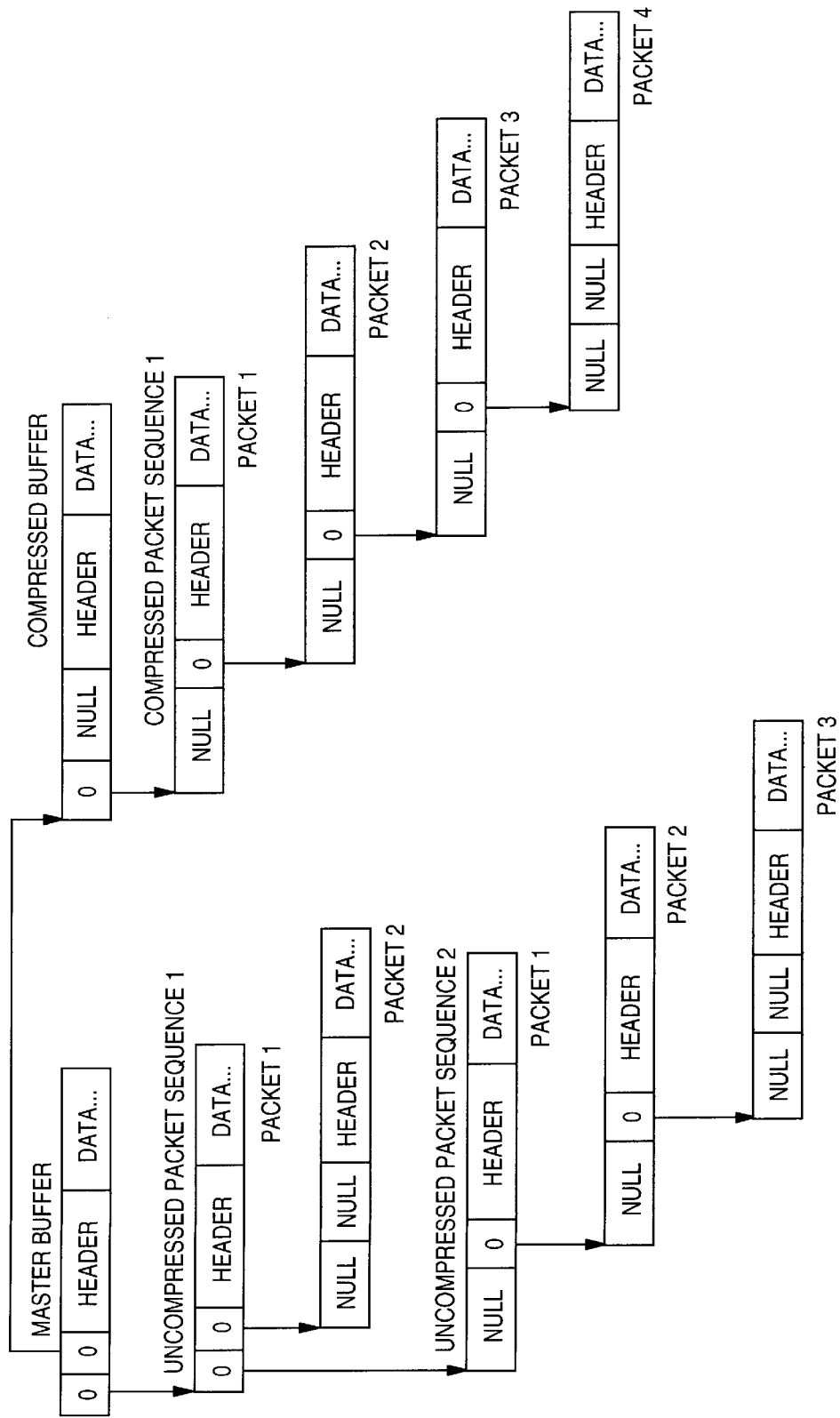
FIG. 6 illustrates how multiple versions of a single message are stored.

FIG. 6 illustrates a single message being stored in both segmented and compressed versions. Each version has the form described above—ie a sequence of chained packets having two CCL fields followed by a header and then data. A master buffer stores the uncompressed data in a single segment. The NCL can generate or receive the unsegmented data in the master buffer directly. A pointer to the master buffer is passed between the CCL and the NCL to provide the unique identifier for the message. The first pointers in the first segment of each stored sequence are used to chain together all the versions of the same message with different segment sizes. Effectively there are two chains appended to the master buffer, one of compressed versions of the message and one of uncompressed versions. The second pointer in the master buffer is used to point to the start of the compressed chain, beginning with a compressed, unsegmented (single segment) version of the message (since the master buffer comprises only one segment, this pointer is not needed for chaining segments together). Thus all versions of a message are chained to, and can therefore be accessed through, the master buffer. The different versions in each chain are ordered in terms of decreasing segment size, which means that new versions must be inserted into the middle of the chain if appropriate. An alternative strategy would be to simply order the chains as they are created, in which case new versions are simply hung from the end of the chain.

In this particular implementation, the memory allocation associated with the stored message is controlled by means of a use counter. If it is desired to delete a message from storage, for example because the NCL does not wish to forward it, the use counter will be decremented by one. Providing this returns the use counter to zero, this will free the memory occupied by the message, allowing it to be overwritten.

When the NCL passes a transmission request to the CCL, it passes a pointer to the location of the master buffer (even if the message is originating at that node, the master buffer can effectively be created by the NCL). The first pointer in the master buffer can then be examined to determine whether the message is stored in compressed form, and which segment sizes are available (if any). The stored versions can then be compared against the specifications for the link over which the message is to be transmitted to see if any of the stored versions are appropriate.

Clearly the build-up of messages must not exceed the available storage space, and an excess of stored messages also leads to performance degradation. Deleting messages that are not being forwarded is an effective way of achieving this. Another possibility is for the CCL to implement a strategy of deleting messages that have been dormant a certain length of time. Note that it is still possible to transmit a message which is no longer stored in segmented form—however in this case the normal compression and segmentation will be required prior to transmission.

One consequence of the message forwarding scheme outline above is that it is expensive to have to alter a message on route. This is because once the information in the message has changed, then the error coding and compression need to be fully recalculated, and the whole segmentation process repeated. In the particular implementation described, this is relevant to messages that are sent to a subset of the total network. Whilst it is simple to address a message either to a single terminal, or to all of the terminals (ie broadcasting), if the message is to be sent to a subset of terminals the address information changes in length as the message progresses through the network. This prevents re-use of the segmented, compressed message, and so required the expense of re-processing at each node.

To overcome this problem, a message intended for just a subset of the network is sent in two parts (ie effectively as two messages). The first part contains the addressing information, together with a message identifier, and is sent slightly ahead of the second part, which contains the data itself, a long with a corresponding identifier. The first part is much smaller, and although it needs to be resegmented at each node to accommodate its variations in length, this does not require undue amounts of processing power. Each node can then use the information from the addressing message to decide where and whether to forward the second, much larger message, which can therefore be sent unaltered around the network with a constant size, without reprocessing at each node.

What is claimed is:

1. In a computer network having a plurality of computers interconnected by different types of transmission links, a method for operating computers in said computer network comprising the steps of:

(a) simultaneously storing in at least one computer multiple different forms of a message, said multiple different forms of the message including an original form, and at least one of a form suitable for transmission over the different types of transmission links to other computers in the computer network, and a form intermediate the original form and the form suitable for transmission over the different types of transmission links;

(b) determining, in the at least one computer, if the message is to be forwarded to one or more of the other computers;

(c) if the message is to be forwarded, selecting a form of the message with characteristics which are compatible with the links over which the message is to be transmitted; and (d) transmitting the selected message over the links to the one or more other computers.

2. The method of claim 1 wherein step (b) further includes the step of deleting the message from the at least one computer if the message is not to be forwarded.

3. A method of operating a computer in a network including at least first and second other computers, including the steps of:

receiving a message at the computer from said first other computer over a link with said first other computer, said message having been processed before sending from an original form into a form suitable for transmission;

processing the message, on receipt at the computer, back into the original form;

simultaneously storing the message received by the computer in at least one of the transmitted form, and a form intermediate the original form and the transmitted form;

deciding at the computer to forward the message to said second other computer in the network;

retrieving the stored message and processing it if necessary into a form suitable for transmission; and sending the retrieved message to said second other computer.

4. The method of claim 3 wherein processing the message from the original form into a form suitable for transmission includes compressing the message, and said step of storing comprises storing the message in compressed form.

5. The method of claim 3 wherein processing the message from the original form into a form suitable for transmission includes segmenting the message, and said step of storing comprises storing the message in segmented form.

6. The method of claim 5, further comprising the step of determining whether the stored message has a segment size appropriate for transmission over the link which the message is to be transmitted to said second other computer.

7. The method of claim 6 wherein the segment size appropriate for transmission is determined based on the time required to re-segment the message relative to the delay that would be incurred by using a non-optimum segment size.

8. The method of claim 7 further including the step of monitoring the current performance of the network in order to determine the optimum segment size for each link.

9. The method of claim 3, further comprising the step of deleting the stored message if the stored message is not to be forwarded to said second other computer.

10. The method of claim 3, further comprising the step of storing the message in original form and wherein each processed form of the message is stored in a linked chain appended to the stored original form of the message.

11. A method of operating a computer in a network including the steps of:

processing at the computer, a message from an original form into a form suitable for transmission;

transmitting said message in processed form from the computer over a link to a first other computer in the network;

storing in the computer the message in at least one of the transmitted form, and a form intermediate the original form and the transmitted form;

deciding at the computer to forward the message to a second other computer in the network;

retrieving the stored message and processing the retrieved message if necessary into a form suitable for transmission; and sending the processed message to said second other computer.

12. The method of claim 11, wherein the step of processing the message from the original form into a form suitable for transmission includes compressing the message, and said step of storing comprises storing the message in compressed form.

13. The method of claim 12, wherein the step of processing the message from the original form into a form suitable for transmission includes segmenting the message, and said step of storing comprises storing the message in segmented form.

14. The method of claim 13, further comprising the step of determining whether the stored message has a segment size appropriate for the link over which the message is to be transmitted to said second other computer.

15. The method of claim 14, wherein the segment size is determined based on the time required to re-segment the message relative to the delay that would be incurred by using a non-optimum segment size.

16. The method of claim 15, further including the step of monitoring the current performance of the network in order to determine the optimum segment size for each link.

17. The method of claim 11, further comprising the step of deleting the stored message if it is decided not to forward the message to said second other computer.

18. The method of claim 11, further comprising the step of also storing the message in original form, and wherein each processed form of the message is stored in a linked chain appended to the stored original form of the message.

19. A computer adapted for use in a network, wherein messages are transmitted from the computer over links with at least first and second other computers in the network, said computer comprising:

means for processing a message before sending to said first other computer from an original form into a form suitable for transmission;

means for storing the message transmitted from the computer to said first other computer in either the transmitted form, or a form intermediate the original form and the transmitted form;

means for deciding to forward the message to said second other computer;

means for retrieving the stored message and processing the stored message if the stored message is not in a form suitable for transmission; and means for sending the retrieved message or the processed message to said second other computer.

20. The computer of claim 19, including means for compressing the message in order to process the message from the original form into a form suitable for transmission, the message being stored in compressed form.

21. The computer of claim 19, including means for segmenting the message in order to process the message from the original form into a form suitable for transmission, the message being stored in segmented form.

22. The computer of claim 21 further including means for determining whether the stored message has a segment size appropriate for the link over which the message is to be transmitted.

23. The computer of claim 22 further including means for monitoring the current performance of the network in order to determine the optimum segment size for each link.

24. The computer of claim 19, further comprising means for deleting the stored message if said stored message is not to be forwarded to said second other computer.

25. A computer adapted for use in a network, wherein messages are transmitted to and from the computer over links with at least first and second other computers in the network, said computer comprising:

means for receiving a message from said first other computer, said message having been processed before sending from an original form into a form suitable for transmission;

means for processing the message on receipt back into the original form;

means for storing the message in either the transmitted form, or a form intermediate the original form and the transmitted form;

means for deciding to forward the message to said second other computer;

means for retrieving the stored message and processing it if necessary into a form suitable for transmission; and means for sending the retrieved message to said second other computer.

26. The computer of claim 25, including means for compressing the message in order to process the message from the original form into a form suitable for transmission, the message being stored in compressed form.

27. The computer of claim 25, including means for segmenting the message in order to process the message from the original form into a form suitable for transmission, the message being stored in segmented form.

28. The computer of claim 27, further including means for determining whether the stored message has a segment size appropriate for the link over which the message is to be transmitted.

29. The computer of claim 28, further including means for monitoring the current performance of the network in order to determine the optimum segment size for each link.

30. The computer of claim 25, further comprising means for deleting the stored message if it is decided not to forward the message to said second other computer.

31. A method of transmitting data to a subset of a network of computers wherein messages are transmitted to and from a computer over links with other computers in the network, messages being processed before sending from an original form into a form suitable for transmission, and processed on receipt back into the original form, messages being stored in either a transmitted form, or a form intermediate the original form and the transmitted form and retrieved from storage for sending to another computer, said method comprising the steps of:

transmitting a first message specifying the subset of the network to which the data is to be transmitted; and transmitting a second message containing the data, wherein a computer receiving the second message uses the information in the first message to forward the second message to another computer in the network without having to first process the second message back into its original form.

* * * * *